Patented Aug. 20, 1935

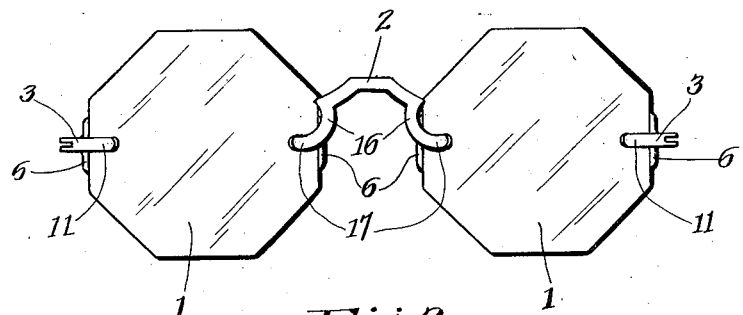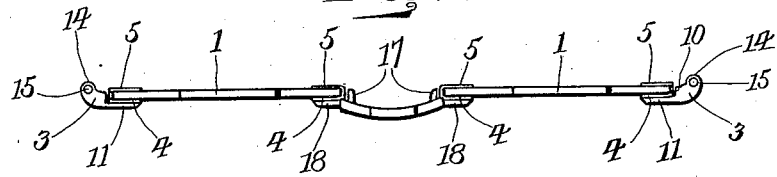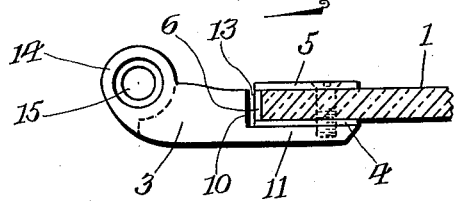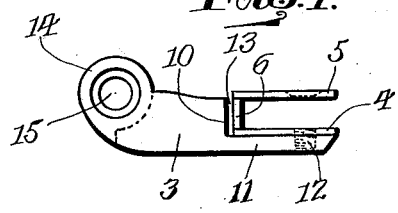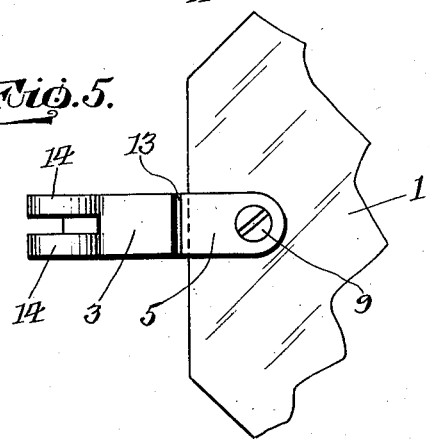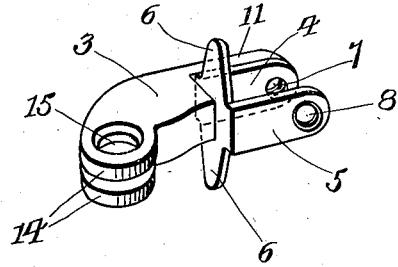

2,011,905

UNITED STATES PATENT OFFICE 2,011,905

RIMLESS SPECTACLE MOUNTING

Emanuel Pappert, Flushing, N. Y., assignor to The Ful-Vue Sales Company, Washington, D. C., a firm Application April 8, 1933, Serial No. 665,223

11 Claims. (Cl. 88—53)

This invention relates in general to spectacles, and more particularly has reference to a means for securing the supporting means to the lenses of a pair of rimless spectacles.

The rimless spectacles of the past have customarily been supported by forming openings though the lenses adjacent their edges, fitting more or less rigid non-resilient lens holding members around the edges of the lenses and subsequently securing them in place by means of screws passing through the holes in the lenses. This has proven unsatisfactory for the reason that if these lens holding members were not properly adjusted to the lens edge before inserting the securing screw, a broken lens would result.

It has also been attempted to utilize light resilient lens holding members for this purpose, but these have proven unsatisfactory for the reason that no practical means of securing the temples and other parts to the lens holding members has been devised which would not render the lens holding members non-resilient, and further for the reason that desirable ornamentation was impossible on the surface of the spring metal used for such lens holding members.

It is an object of this invention to provide a lens holding member for a rimless spectacle lens which shall have the desirable features of resiliency and at the same time will provide a surface upon which ornamentation may readily be placed and parts suitable for connection to other parts of the mounting.

Other objects and advantages of this invention will become apparent from the following description taken in connection with the accompanying drawing, it being understood that the same are by way of example and illustration only and are not to be taken as in any way limiting the spirit or scope of this invention. The spirit and scope of this invention are to be limited only by the prior art and by the terms of the appended claims.

Referring now more particularly to the drawing in which like numerals indicate corresponding parts throughout:

Figure 1 is a front view of a spectacle embodying this invention.

Figure 2 is a plan view of the same.

Figure 3 is an enlarged view partly in section, illustrating the lens mounting in place on a lens.

Figure 4 is a view similar to Figure 3 without the lens.

Figure 5 is an enlarged rear view of the device in position on a lens.

Figure 6 is an enlarged perspective view of the endpiece of this invention.

In accordance with this invention the lenses 1 are joined together at their nasal edges by means of the bridge 2, and are provided at their temporal edges with end pieces 3 which are adapted to hingedly receive conventional temples. The end pieces 3 are of arm-like form.

The end pieces 3 and the bridge 2 are each secured to the lenses 1 by means of horizontally disposed yoke-shaped lens holding members formed of spring metal. These lens holding members are each formed with a pair of strap ears 4 and 5 adapted to engage the front and rear surfaces respectively of the lens. Each lens holding member is also provided with an elongated lens edge engaging portion. The ears 4 and 5 are each perforated at 7 and 8 respectively for the purpose of receiving a screw 9, adapted to extend through the two ears and the lens and secure the parts in position with respect to each other. One ear 4 has its perforation 7 threaded to cooperate with the threads on the screw 9.

Each endpiece 3 is rabbeted to fit around its lens strap, and to form a shoulder 10 disposed transversely of, and a part of reduced thickness extending inwardly from the inner end of shoulder 10. The said reduced part provides a projection or facing flange 11 adapted to engage and substantially coincide with the front face of the strap ear 4. This flange 11 is provided with a threaded opening 12 in its rear surface in position to register with the opening in the ear 4 and receive the end of the screw 9. This opening 12, it will be noted, does not extend through to the front surface of the flange 11. It is noted also that the flange 11 is of such size that when it is in proper register with the ear 4 there will be an open space 13 between the shoulder 10 and the edge engaging portion 6.

The flange 11 is secured to the strap ear 4 in some suitable manner such as by soldering before the lens strap is secured to the lens. This obviously destroys the resiliency in the strap ear 4, but does not destroy the resiliency in the strap ear 5 or the portion 6 which are not secured to the flange 11. This composite end-piece may then be secured to the lens as shown and will possess all the advantages of a resilient mounting because the solid flange 11 is attached only to one strap ear. At the same time it will possess the advantages of a solid endpiece in that it will present a surface which may be ornamented as well as a solid mounting for the temple hinge connection. This connection, as clearly shown is formed by the bifurcation of the outer end of the endpiece to form the ears 14 perforated at 15 to receive a screw for securing the temples in place therebetween.

The bridge 2 is provided at its opposite ends with downwardly extending legs 16 having shouldered portions 17 at their lower ends corresponding to the shouldered portions 10 on the endpieces. These legs are likewise provided with laterally extending flanges 18 corresponding in size and function to the flanges 11 on the endpieces. These flanges 18 are secured to their strap ears 4 in the same manner and for the same purpose as the flanges 11 are secured to their strap ears 4.

What I claim is:—

1. In a device of the character described, a rimless lens, a relatively flexible and resilient lens strap having ears engaging the opposite faces of the lens, and a lens edge engaging portion adapted to snugly embrace the edge of a lens, said ears having aligned openings therein, said lens having an opening therein in alignment with said openings in the strap ears, a relatively rigid and non-resilient lens supporting means having a part secured to the strap ear which engages the front surface of the lens, an opening in said part of the supporting means in alignment with the aforementioned openings, said last mentioned opening terminating short of the front surface of the supporting means, and threaded securing means extending from the rear of the lens strap through the openings in the strap ears and the lens and into the opening in the supporting means, said supporting means being spaced from all portions of said lens strap except the ear to which it is secured so as to permit said relatively flexible resilient lens strap to be flexed to snugly conform to the contour of the lens without interference from said relatively rigid non-resilient lens supporting means.

2. In a device of the character described, a rimless lens, a relatively flexible and resilient lens strap having ears engaging the opposite faces of the lens, and a lens edge engaging portion adapted to snugly embrace the edge of a lens, said ears having aligned openings therein, said lens having an opening therein in alignment with said openings in the strap ears, a relatively rigid and non-resilient lens supporting means having a part secured to the strap ear which engages the front surface of the lens, an opening in said part of the supporting means in alignment with the aforementioned openings, and securing means extending through all of said openings to secure the lens strap and supporting means in position with respect to said lens, said supporting means being spaced from all portions of said lens strap except the ear to which it is secured so as to permit said relatively flexible resilient lens strap to be flexed to snugly conform to the contour of the lens without inteference from said relatively rigid non-resilient lens supporting means.

3. In a device of the character described, a relatively flexible and resilient horizontally disposed yoke-shaped lens strap member having spaced ears adapted to engage the opposite faces of the lens, said ears having openings therein adapted to receive a securing means for securing the lens strap in place, and relatively rigid and non-resilient lens supporting means in the form of an arm having an inner portion of reduced thickness secured to the strap ear which engages the front surface of the lens, the remaining portions of said arm being spaced from the other portions of said member so as to permit said relatively flexible resilient lens strap to be flexed independently of said relatively rigid and non-resilient lens supporting means.

4. In a device of the character described, a relatively flexible and resilient lens strap having ears adapted to snugly engage the edge and the opposite faces of the lens on the nasal edge thereof, said ears having openings therein adapted to receive a securing means for securing the lens strap in place, and a relatively rigid and non-resilient nose bridge member having a part secured to the strap ear which engages the front surface of the lens, said bridge member being spaced from the other portions of said member so as to permit said relatively flexible resilient lens straps to be flexed independently of said relatively rigid and non-resilient nose bridge members.

5. In a rimless spectacle mounting for the temple side of a lens, a horizontally disposed end piece of a single length of material and arm-like form, said end piece being rabbeted in its rear face to provide it with a transverse shoulder intermediate its ends located adjacent the temple side edge of the lens and an inwardly directed part of reduced thickness extending from the inner end of said shoulder to oppose the forward surface of the lens in spaced relation thereto, and a closed outer end and an open inner end relatively flexible resilient yoke-shaped lens-holding strap formed with a pair of spaced apertured opposed parts for securing to the front and rear surface of the lens, that part of said strap for opposing the front surface of the lens opposing and being secured to the inner face of said reduced part, the closed outer end of said strap bearing against the temple side edge of the lens and said shoulder being spaced from the closed outer end of said strap.

6. In a rimless spectacle mounting for the temple side of a lens, a horizontally disposed end piece formed of a single length of material having its inner portion of less thickness than its outer portion, the junction of said portions of different thickness providing an upstanding rearwardly extending shoulder, a lens-holding strap formed with a pair of apertured parts disposed in spaced parallel relation for securing to the outer and inner surfaces of a lens, said strap being of yoke-shaped form and having a closed outer and an open inner end, that part of said strap to be secured to the outer surface of the lens seating against and being secured to the inner face of the said inner portion, said strap having its closed inner end and the other of said parts spaced from said end piece, the said closed inner end of said strap opposing said shoulder and bearing against the temple side edge of a lens.

7. In a rimless spectacle mounting an end piece having its inner portion of less thickness than its outer portion, the junction of said portions of different thickness providing an upstanding rearwardly extending shoulder, a lens-holding strap formed with a pair of apertured parts disposed in spaced relation for securing to the outer and inner surfaces of a lens, said strap being of yoke-shaped form and having a closed outer and an open inner end, said yoke being horizontally disposed and having its closed outer end bearing against the temple side edge of the lens, that part of said strap to be secured to the outer surface of the lens being secured to the inner face of the said inner portion, said strap having its closed inner end and the other of said parts spaced from said end piece, said reduced inner portion being provided with an aperture aligning with the apertures in said parts, said parts and reduced portion having the apertures therein arranged in close proximity to the inner ends thereof, and a holdfast means common to said parts and inner portion and to the lens.

8. A temple end piece for the lenses of rimless spectacles comprising a horizontally disposed one-piece arm having its rear face rabbeted to provide intermediate its ends a vertically disposed rearwardly extending shoulder and an inwardly extending part of reduced thickness having its rear face terminating at one end into the forward end of said shoulder, a vertically disposed bearing part opposing said shoulder and for abutting the temple side edge of a lens, a pair of spaced horizontally disposed parallel resilient arms, integral at one end with the forward and rear edges of said bearing part and opposing the forward and rear surfaces of the lens, one of said arms opposing the rear face of said reduced part, said arms and reduced part provided with apertures for the reception of a holdfast device extended through the lens for anchoring them together and said arms against the lens.

9. A temple end piece for the lenses of rimless spectacles comprising a horizontally disposed one-piece arm having its rear face rabbeted to provide intermediate its ends a vertically disposed rearwardly extending shoulder and an inwardly extending part of reduced thickness having its rear face terminating at one end into the forward end of said shoulder, a vertically disposed bearing part opposing said shoulder and for abutting the temple side edge of a lens, a pair of spaced horizontally disposed parallel resilient arms, integral at one end with the forward and rear edges of said bearing part and opposing the forward and rear surfaces of the lens, one of said arms opposing the rear face of said reduced part, said arms and reduced part provided with apertures for the reception of a holdfast device extended through the lens for anchoring them together and said arms against the lens, the said bearing part having a portion extending upwardly with respect to top edges of said arms and a portion depending downwardly with respect to the bottom edges of said arms.

10. A temple end piece for the lenses of rimless spectacles comprising a horizontally disposed one-piece arm having its rear face rabbeted to provide intermediate its ends a vertically disposed rearwardly extending shoulder and an inwardly extending part of reduced thickness having its rear face terminating at one end into the forward end of said shoulder, a vertically disposed bearing part opposing said shoulder and for abutting the temple side edge of a lens, a pair of spaced horizontally disposed parallel resilient arms, integral at one end with the forward and rear edges of said bearing part and opposing the forward and rear surfaces of the lens, one of said arms opposing the rear face of said reduced part, said part of reduced thickness being formed in proximity to its free end with an aperture having a threaded wall, one of said arms being provided in proximity to its free end with a countersunk aperture aligning with the said other aperture, the other of said arms in proximity to its free end being formed with an aperture aligning with the other of said apertures, and a holdfast device for the lens for extension through the latter and extending through the apertures of said arms and anchored to the wall of the aperture in said reduced part.

11. In a rimless spectacle mounting for the temple side of a lens a horizontally disposed one piece arm having its outer end providing a temple hinge connection, said arm rabbeted on its rear side to form intermediate the ends thereof a rearwardly directed shoulder for opposing the temple side edge of the lens and a reduced part extending inwardly with respect to said shoulder and having its rear face flush with the forward end of the shoulder, a yoke-shaped member having its base opposing said shoulder, the arms of said member being resilient and adapted to oppose the forward and rear surfaces of the lens, one of said arms seating against the rear face of said reduced part, the base of said member bearing against the temple side edge of the lens, and means extending through said arms and anchored to said reduced part for clamping said member to the lens and for coupling the arm to the yoke.

EMANUEL PAPPERT.